Patented Jan. 6, 1948

2,433,832

UNITED STATES PATENT OFFICE 2,433,832

RESIN TREATMENT

Laszlo Auer, South Orange, N. J.

No Drawing. Application January 25, 1943,
Serial No. 473,548

8 Claims. (Cl. 106—218)

This invention relates to coating compositions and is particularly concerned with an improved varnish or varnish base.

According to the invention the varnish base is prepared with a synthetic varnish resin treated to incorporate an aromatic amine or amino-compound. The present application is a continuation-in-part of my copending application Serial No. 383,049, filed March 12, 1941, issued as Patent No. 2,309,088, January 26, 1943.

By "varnish base" as used herein, I mean all or part of the varnish solids, i. e., the film forming ingredients of the varnish. Varnish bases are frequently prepared of mixtures of rosin or resins with oils, especially fatty oils of the drying or semi-drying types.

It is an object of the invention to secure improved properties in a varnish base by employing a treated synthetic varnish resin as the resinous ingredient. For example, according to the invention, it is possible to improve the water and alkali resistance of the varnish base and also various other characteristics, such as drying properties, water resistance, etc.

According to the invention the modifying agent, i. e., the amino-compound is incorporated in the varnish resin by heating the resin together with the amino-compound. The manner in which this is accomplished will be pointed out more fully hereinafter.

At this point, however, reference is made to the class of amino-compounds contemplated for use according to the present invention.

In general, the amino compounds here employed are aromatic di-primary amines, or their substitution products, homologues and their derivatives, or salts either of the amines themselves or of said substitution products.

Certain of the amino-compounds may be quite complex in molecular structure, incorporating groupings and radicals of various types, as will be seen from a typical list of compounds suitable for use, as given herebelow.

Examples of di-primary amines, substitution products, and salts of either, are as follows:

Benzidine
Dianisidine
pp-Diaminobenzophenone
pp-Diaminodiphenyl ether
pp-Diaminodiphenylthiourea
p-Diaminomethylcarbazole
Para-phenylene diamine
Ortho-phenylene diamine
Meta-phenylene diamine
Para-tolylene diamine
pp-Diamino-diphenyl benzophenone
1:4 diamino anthraquinone
pp-Diamino-diphenylmethane
pp-Diaminodiphenyl sulfide
Diaminodihydroxyanthraquinonedisulfonic acid
Diaminotetrahydroxyanthraquinonedisulfonic acid
p-Diamino-dimethyl carbazole
Safranine Certain compounds containing amine groupings such that the compounds may be classified as di-primary amines, but which compounds further include other amine groups are as follows:

pp-Diaminodiphenylamine
pp-Diaminodiphenylurea
Diaminodiphenazine
Diaminofuchsonimine
Safranine A Similarly salts of substituted di-primary amines which also contain other amine groups are materials such as diaminodiphenylamine sulfate.

From the foregoing it will be seen that the amino-compounds which may be employed are of quite a wide variety of types. In instances where various substitution products are employed, the treatment may be the composite effect of different groupings or radicals. Thus, for instance, in the case of a salt (for example a sulfate) the sulfate portion of the compound may contribute one type of characteristic to the final product, another characteristic being contributed by the amine grouping.

Selection of the modifying agent should therefore be made in accordance with the properties desired in the varnish being prepared. For many purposes I prefer those di-primary amines, substitution products thereof, and salts of either, where the amino-compound does not contain other types of amines in the molecule. In this way the effect of the di-primary amine group may be more predominant in the modification secured.

I have found that many of these compounds are advantageous in increasing water and alkali resistance of the varnish base incorporating the modified resin. Frequently the compound increases the melting point of the resin and contributes to improved drying characteristics.

Hereinafter reference is made to the types of synthetic varnish resins contemplated for employment in the varnish bases prepared according to this invention. Here, however, brief reference is made to appropriate conditions under which the amino-compound may be incorporated in the varnish resin.

As above noted, the resin is preferably heated together with the amino-compound, the compound being present anywhere from a trace, for instance, .1% up to about 10%, particularly good results being secured in the range from about 2% to about 5%. For special purposes, larger amounts may be used, for instance, up to about 30%.

With regard to the percentage, it may further be mentioned that after mixing the modified resin with the other varnish ingredients, for instance, fatty oils, or other resin materials, such as rosin, the percentage of amino-compound present in the varnish base will, of course, be reduced. A percentage, even down to about .01% (based on the varnish base) may be sufficient to contribute certain desirable properties.

The temperature of treatment should be within a range extending from about 100° C. to about 350° C., but not above the point at which appreciable destructive distillation of the resin will take place. Usually temperatures from about 200° C. to about 310° C. are employed.

The time of treatment at the reaction temperature may be varied over a considerable range, depending upon the properties desired and the materials being employed, although the time usually need not exceed about 1 to 5 hours. In some cases modification is brought about quite rapidly and the batch may be permitted to cool almost immediately upon attaining the desired treatment temperature.

The properties and results may be different according to selection of modifying agent, percentage used, time and temperature of treatment, etc.

Incorporation of the amino-compound in the varnish resin need not always be effected in the same way, considerable variation being possible from the standpoint of procedure. The amino-compound may, for instance, be incorporated in the varnish base after compounding thereof, in which event the amino-compound may conjointly modify the properties not only of the varnish resin present but also of other ingredients employed, such as drying or semi-drying fatty oils. Still other procedures for incorporating the amino-compound in the varnish base are mentioned hereinafter in connection with examples.

It may be advantageous to conduct the heating of the resin when the amino-compound is being incorporated, in the absence of air, or at least out of contact with any substantial quantity of air. For this purpose the reaction may be carried out in a closed vessel, though not necessarily at a positive pressure, so that the gases or fumes of the reaction released from the modifying agent serve to exclude the air. For some purposes positive pressure may be used.

Vacuum is also effective for the purpose of excluding air, and in addition, reduction in contact of air may be brought about by blanketing the surface of the reaction mixture with some inert gas, such as $SO_2$, $CO_2$ or nitrogen, or by bubbling such gases through the reaction mixture. Where vacuum is used, a pressure, for instance, of about 100 mm. Hg. to about 450 mm. Hg. will be found effective, although higher or lower may be used.

Various gases may be employed for their supplemental effect during the treatment procedure and gases for various purposes may either be employed as a blanket on the surface of the batch undergoing treatment or may be bubbled through the reaction mixture.

Supplemental treating agents may be present during the reaction, among which might be mentioned dissolution promoting agents of the type described in my issued Patent No. 2,293,038.

Some more or less general considerations regarding the process should be noted, as follows:

Although the complete mechanism of modification may not be fully understood, it may be mentioned that synthetic varnish resins are organic isocolloids, i. e., colloidal systems in which the dispersed phase and the dispersion medium are both of the same chemical composition, though present in different physical states.

By modification I believe that the relationship or relative proportions of the dispersed phase and dispersion medium may be altered.

Whatever the exact nature of the chemical, colloidal and/or physical changes which are brought about, various advantageous modifications in properties may result, depending upon the particular modifying agent selected and the treatment conditions employed.

The modified resin to be incorporated in the varnish base may, if desired, be subjected to other treatment, depending upon the use for which it is intended. Thus, for example, modified resins may be vulcanized with sulfur by application of heat. On the other hand, the varnish bases prepared may also be vulcanized after compounding thereof, and the bases, in solutions may even be vulcanized with sulfur chloride.

The varnish base may be employed either clear or pigmented.

In general, the invention contemplates treatment of various different types of synthetic varnish resins.

The invention is particularly applicable to certain types of varnish resins, as mentioned below.

The synthetic resins containing natural resins, such as rosin, etc., chemically combined in the resinous complex, give valuable modified resins by the present processes. For instance, the resinous esters obtained by esterifying natural resins with polyhydric alcohols are advantageous starting materials in this invention. The best known (and probably the simplest) of such resin esters is the so-called "ester gum." Commercially, ester gums are usually made by esterifying rosin with glycerine. Such ester gums or rosin glycerides are well known varnish resins and are widely used in making various varnishes. By the present invention, any of the commercial ester gums can be readily modified to improve their properties for such purposes.

Likewise, other resinous esters of glycerine and natural resins, such as copals, etc., may also be modified by my methods. Also, the resinous esters obtained by esterifying rosin, copals and other acid natural resins with other polyhydric alcohols, such as glycols, pentaerythritol, mannitol, sorbitol, etc., are useful as the starting material and give good modified resins.

In fact, I have found that resinous esters of polyhydric alcohols, generally, can be modified by my present processes. And those in which the polyhydric alcohol is esterified in part by a natural resin and in part by another acid, either mono- or di-basic acid, can be readily modified. For instance, the so-called "maleic resins" give advantageous modified resin products by my present processes. These "maleic resins" are resinous esters made by condensing and esterifying maleic anhydride, rosin and glycerine.

Further, by the present invention, I can also modify other synthetic resins containing natural resins, including those containing the natural resin as such. For instance, the so-called "resin-modified" phenolics or "Albertols" can also be modified by my present processes to improve their properties. Such phenolic resins are phenol-aldehyde resins containing a sufficient amount of natural resins or of esters thereof, to alter their solubility and other properties. They are now used in making varnishes, particularly the phenol-formaldehyde resins containing rosin or other natural resins or their esters with polyhydric alcohols such as glycerine. In my present invention, any of these phenolic resins can be advantageously modified with the aid of amine compounds by my processes.

Thus in the practice of this invention, I can use a wide variety of resins, both natural and synthetic resins, and obtain a wide range of modified resin products useful in making plastic and liquid coating compositions.

The modified resin products obtained according to the present invention have many advantageous properties. In general, they have lower acid values and higher melting points than the original resin. Further, those prepared with amine compounds which are insoluble or only very slightly soluble in water, such as benzidine etc., also have improved resistance to water; and usually their alkali resistance is also improved. That is, coatings containing such modified resin products are less attacked by dilute alkali solutions and therefore have improved resistance to washing, particularly with slightly alkaline soap solutions. In general, coatings containing my modified resin products have better ageing qualities when exposed to atmospheric conditions.

Thus, my modified resins are useful in making varnishes and other coating compositions having such improved properties. They are particularly useful in making coating compositions such as varnishes etc. yielding films having very satisfactory water resistance and improved alkali resistance and other advantageous properties. For instance, they may be used in making floor paints and cement paints wherein resistance to water and alkali are important. Also they are useful in making varnishes and enamels for kitchen furniture.

These and other advantageous plastic and liquid coating compositions may be prepared in various ways. In some cases, varnishes and the like may be made by simply dissolving my modified resin products in suitable volatile solvents. And my modified products are readily soluble in various types of varnish solvents such as mineral spirits, aromatic hydrocarbons and other volatile organic solvents used in the commercial art. Likewise, my modified resin products may be compounded with other varnish ingredients to produce improved coating compositions. And usually, my modified products are not used alone as protective coatings. For instance, they may be cooked into a varnish by adding fatty oils, such as drying oils or semi-drying oils, to them and cooking the oil and modified resin together until the desired varnish base is obtained. Further, any of the ordinary resins now used in making varnishes, can be introduced into the varnish mixture and cooked in the usual way. That is, my improved modified resin products can be made into varnishes by any of the procedures now used in the commercial manufacture of varnishes and like coating compositions. And after the desired varnish base is obtained, by the usual cooking together of the varnish ingredients, it is cooled and thinned, that is, dissolved in a suitable mixture as is the customary practice in the art. The combination of oil, resin and thinner is the varnish. And suitable driers may be incorporated, as is the customary practice in the art. My improved varnishes so obtained may be used alone as a protective coating or made into a paint or enamel by grinding pigments into the same. In other words, I make my improved varnishes in any of the ordinary ways and obtain the desired improvements by incorporating a suitable amount of my modified resin products.

Reference to "varnish base" herein, means all or part of the varnish solids, i. e., the film-forming ingredients of the varnish base.

The modified resin may be vulcanized with sulfur either before preparation of the varnish, or conjointly in admixture with other varnish ingredients. Sulfur chloride vulcanization may also be used.

Again, my modified resin products, both my vulcanized and unvulcanized products, are also useful in making aqueous coating compositions wherein my modified resin products are emulsified in an aqueous medium. Such aqueous compositions may be prepared in various ways. For instance, the resin or other resinous aromatic isocolloid may be modified or partially modified by a treatment with the amine compound and the product so obtained further modified and transformed by emulsification or dispersion in an aqueous medium, with or without the aid of emulsifying (dispersing) agents or protective colloids or both. In such processes the aryl amines are satisfactory modifying agents. Such aryl amines are also satisfactory modifying agents in those processes wherein the starting material is first emulsified in an aqueous medium and the emulsion so obtained is subsequently treated with a small amount of an aromatic amine as the modifying agent to produce the desired modification of the organic isocolloid while it is emulsified in such aqueous medium.

Further, aqueous emulsions of vulcanized modified resin products can also be prepared and are useful for various purposes. For instance, the sulfur may be first dispersed in or distributed throughout the modified resin product to be vulcanized to effect an initial vulcanization and then the sulfur-containing mixture dispersed or emulsified in the aqueous medium and in this emulsified state subjected to a suitable temperature treatment and other reaction conditions until the desired degree of vulcanization is obtained. Likewise, my vulcanized modified resin products may also be directly emulsified in suitable aqueous media. In either case, the emulsification may be carried out with the aid of the usual emulsifying agents, with or without further addition of protective colloids. Here too, the vulcanization process is greatly facilitated by the application of steam during vulcanization in the emulsified state.

Further, in making my modified resin products and compositions containing the same, pigments or fillers, or both, may be added at any convenient stage if desired.

Thus, the present invention comprises a wide variety of modified resin products and compositions containing the same.

Advantageous methods of modifying synthetic resins, particularly resinous esters, are illustrated in Examples 1, 2 and 3. In those examples, the starting material is a commercial synthetic resin of the maleic type now used in making various types of varnishes. This commercial maleic resin contains a substantial amount of rosin chemically combined in the resinous complex and is made by reacting sufficient glycerine with 12 to 16 parts of maleic anhydride and 100 parts of rosin to form a maleic resin having an acid value of 36 and a melting point of 135° C. In the following example this resin is directly modified by incorporating a minor amount of an amine compound as the modifying agent.

*Example 1.*—In modifying the said commercial maleic resin, benzidine is employed as the modifying agent.

In doing so, 100 parts of this resin and 0.5 part of benzidine base are heated to 200° C. and maintained at that temperature for two hours. Then the resinous mixture is heated to 240° C. and after reaching this temperature, the resin is allowed to cool.

The modified maleic resin so obtained has a color slightly darker than the original maleic resin before treatment. It has a melting point of 132° C. and an acid value of 34.5. It is useful and advantageous in making varnishes and other coating compositions.

In the above example, other amine compounds may be used in lieu of benzidine as the modifying agent; advantageously amine compounds which are insoluble or only very slightly soluble in water. Again, the amount of modifying agent may be increased if a greater modification is desired, as shown ante.

Further, in addition to modifying such synthetic resins by directly incorporating the amine compound therein, as shown in the above example, they can also be modified by incorporating in such synthetic resins, minor amounts of the modified resin products made according to the processes described ante and containing an amine compound dispersed therein. For instance, modified resin products obtained from natural resins, such as rosin, etc. are advantageous for this purpose. That is, in the practice of the present invention two-step methods may be employed. This is advantageous in making modified synthetic resins containing natural resins as a component of the resinous mixture. The use of my modified resin products, as the modifying agent, in such two-step processes is illustrated in the following examples:

*Example 2.*—In this example, the commercial maleic resin mentioned ante is modified with a minor amount of a benzidine modified resin product made by heating 100 parts of rosin with 10 parts of benzidine for 5 hours at a temperature of 270°–280° C.

100 parts of the said maleic resin and 10 parts of said benzidine modified resin product are heated in the same way described in Example 1.

The modified maleic resin so obtained has a slightly darker color than the original maleic resin. It has a melting point of 130° C. (mercury method) and an acid value of 41.

In the above example, other amine modified resin products made in accordance with the disclosure of my application Serial No. 383,049, issued as Patent No. 2,309,088, January 26, 1943, may be used in lieu of the said benzidine modified resin product, as the modifying agent. Again, the amount of such modifying agent may be varied as illustrated in the following example.

*Example 3.*—In this example, the said commercial maleic resin mentioned ante is modified with 5 per cent of the same modified resin product employed in Example 2; the heating and other conditions being the same as in that example.

In doing so, 100 parts of said maleic resin and 5 parts of said benzidine modified resin product are heated in the same way described in Example 1.

The modified maleic resin so obtained has a melting point of 130° C. and an acid value of 38.

The modified maleic resins obtained in Examples 2 and 3 are useful in making varnishes and other coating and plastic compositions. And I have found that coatings containing any of these modified maleic resins, namely, the modified resin products obtained in Examples 1, 2 and 3, have improved alkali resistance and also improved resistance to cold and boiling water.

Thus, the methods set forth in Example 1 and Examples 2 and 3, yield advantageous modified products, and by the methods there illustrated, advantageous modified resin products can be obtained from other resinous esters of polyhydric alcohols, as above mentioned. In other words, the said examples are merely illustrative of the present invention and other embodiments thereof may be employed within the broad scope of this invention.

In all cases, advantageous modifications of the synthetic resin are obtained. And as shown in Examples 1, 2 and 3, such modifications thereof can be obtained with relatively small amounts of an amine compound as the modifying agent. And as further shown in those examples, this may be done at relatively low temperatures. For instance, the slight decrease in melting point in Examples 1, 2 and 3, as compared with the melting point of the original maleic resin, is due in part to the low temperature employed and in part to the low percentage of modifying agent used. For purposes of comparison, the acid value and melting point of the original maleic resin and of the modified resin products obtained therefrom are given in the following table.

*Table 1*

|  | Original maleic resin | New Modified maleic resin | | |
| --- | --- | --- | --- | --- |
|  |  | Ex. 1 | Ex. 2 | Ex. 3 |
| Melting point (mercury method) ° C | 135 | 132 | 130 | 130 |
| Acid value | 36 | 34.5 | 41 | 38 |

In comparing the modified resin products of Examples 2 and 3 with the original maleic resin, it should be remembered that in incorporating the modifying agent there used, additional rosin is also introduced into the resinous complex; this added rosin (previously modified with the amine compound) having a lower melting point than that of the original maleic resin. Thus, the melting point in those cases is somewhat lower than that of the original maleic resin. Likewise, this also influences the acid value as is evident from the values given in the above table.

Thus, by selecting the particular modifying agent used and varying the proportion thereof and the other conditions, I can obtain modified resin products having the particular properties desired.

Further, phenolic resins can also be advantageously modified by the present invention, using the methods described ante. And as the starting material in such processes, I may employ any of the commercial phenolic resins containing natural resins or resinous esters thereof. In this way, I obtain advantageous modified resin products as illustrated in the examples given below.

For instance, in Examples 4, 5 and 6, I employ a commercial phenolic resin prepared by reacting formaldehyde with a substituted phenol until a soluble, fusible (A-stage) condensation product is obtained and then combining the A-stage phenolic resin with rosin and glycerine to form a complex phenolic resin. This complex phenolic resin had an acid value of 15 and a melting point of 137° C. It can be advantageously modified with amine compounds, as illustrated in the following examples.

*Example 4.*—In this example, 100 parts of said commercial phenolic resin and 0.5 part of benzidine base are heated to 200° C. and maintained at that temperature for two hours. Then the resinous mixture is heated to 240° C. and after reaching this temperature the resin is allowed to cool.

The amine modified phenolic resin so obtained has a slightly darker color than the original phenolic resin. It has a melting point of 145.5° C. (mercury method) and an acid value of 14.9. It is useful and advantageous in making varnishes and other coating compositions.

Again, in addition to modifying such synthetic resins by directly incorporating the amine compound therein, as shown in the above example, these phenolic resins can also be modified by incorporating minor amounts of modified resin products made by preliminarily modifying rosin with an amine compound. This is illustrated in the following example.

*Example 5.*—In this example, the commercial phenolic resin mentioned ante is modified with a minor amount of the benzidine-modified resin product referred to in Example 2 above.

In doing so, 100 parts of said commercial phenolic resin and 10 parts of said benzidine-modified resin product are heated in the same manner described in Example 4.

The modified phenolic resin so obtained has a slightly darker color than the original phenolic resin. It has a melting point of 138° C. and an acid value of 27.1.

In the above example, the amount of said modifying agent may be varied as indicated above. This is illustrated in the following example.

*Example 6.*—In this example, the procedure is the same as in Example 5 except that only 5 parts of said benzidine-modified resin product (referred to in Example 2) is employed, as the modifying agent.

The modified phenolic resin product so obtained has a melting point of 136° C. and an acid value of 21.

The modified phenolic resin products obtained in Examples 5 and 6, like the modified resin product obtained in Example 4, are advantageous in making varnishes and other liquid coating compositions.

That is, my modified phenolic resin products have advantageous properties in such compositions. In general, they improve the properties of coatings containing substantial amounts of the same. For instance, they impart improved resistance to water, both hot and cold, and to aqueous alkaline solutions. Thus by my methods I obtain various other improvements, in addition to modifying the melting point, acid value and other physical properties of the synthetic resin employed as a starting material. For purposes of comparison, the acid value and melting point of the original phenolic resin employed in Examples 4 to 6 and of the modified resin products obtained therefrom in those examples are given in the following table:

*Table 2*

|  | Original Phenolic resin | New modified phenolic resin | | |
|---|---|---|---|---|
|  |  | Ex. 4 | Ex. 5 | Ex. 6 |
| Melting point (mercury method)_____° C__ | 137 | 145.5 | 138 | 136 |
| Acid value_____ | 15 | 14.9 | 37.1 | 21 |

In preparing the modified phenolic resin products obtained in Examples 5 and 6 it should be remembered that additional rosin is also introduced into the resinous complex in the methods there described. As stated above, those examples are illustrative of my two-step methods of modifying synthetic resins containing a natural resin as a component thereof. They illustrate the second step of such two-step methods.

In all cases, the incorporation of the amine compound, either directly or by a two-step method, produces advantageous modification of the synthetic resin. And in Examples 4 to 6, inclusive, other amine compounds may be employed. Likewise, other phenolic resins can be employed in lieu of the particular commercial phenolic resin there described.

Various commercial phenolic resins containing a natural resin or resinous esters thereof may be employed. Such phenolic resins are now widely used in making varnishes and are prepared by various methods. Some of the commercial phenolic resins of this type are made by heating phenol, formaldehyde and rosin together under reflux until a condensation product is obtained, the excess water distilled off and then esterifying the so condensed resin with glycerine to obtain a complex resin. The complex phenolic resins so prepared are excellent starting materials in my present processes and yield valuable modified phenolic resins according to the present invention.

The modified synthetic resins prepared in Examples 1 to 6, inclusive, have properties which are particularly advantageous, as do the varnishes and coatings obtained from the same. And I have prepared valuable, improved varnishes and coatings from such modified synthetic resins as illustrated below. For instance, valuable varnishes may be prepared as shown in the following example.

*Example 7.*—In this example, the modified maleic resin obtained in Example 1 is used as the resin component of the varnish and is blended with linseed oil stand oil to obtain a valuable varnish base, the said oil and resin being cooked together until the desired body is obtained and then thinned with volatile solvents and driers added to obtain the final varnish.

In making this varnish, 75 parts of said modified maleic resin (Example 1) and 150 parts of heavy-bodied linseed oil (stand oil) are heated to 300° C. and maintained at that temperature for 15 minutes, whereupon the blended mixture is cooled.

The varnish base so obtained is thinned with mineral spirits to obtain a varnish solution containing 50 per cent solids. To this solution are added sufficient naphthenate driers to give a varnish containing 0.03 per cent cobalt, 0.02 per cent manganese and 0.3 per cent lead, calculated as metal and based on the oil used. This solution containing the naphthenate driers is the varnish.

Further, using the same formula and procedure I have prepared similar varnishes from the modified synthetic resins obtained in Examples 2 to 6, inclusive, by substituting each of those modified synthetic resins for the modified maleic resin employed in the above example.

I have prepared coatings from the respective varnishes so obtained by cooking 100 parts of heat bodied linseed oil with 50 parts of the resin, and adding driers and thinning the mixture.

I have found that each of said varnishes containing such modified synthetic resins have advantageous properties. All of them yield films having slightly improved drying velocities, as compared with a similar varnish containing the unmodified synthetic resin. The dried films or coatings so obtained have advantageous properties, for instance, the coatings containing my modified synthetic resins, obtained from the varnishes described above, show marked improvement in alkali resistance by the said tests. They also gave improved resistance to both cold and boiling water.

Such embodiments of the present invention are typical of the improvements which can be obtained in the general practice thereof. Other improved varnishes may be prepared from my modified resin products, i. e., those obtained from synthetic resins, as already described. In making my modified resin products various amine compounds may be employed as stated above, and sometimes the amine compound may be formed in situ. As pointed out above and in my copending application, Serial No. 383,049, issued as Patent No. 2,309,088, January 26, 1943, in connection with modifying rosin and other natural resins, part of the resin acid and the added amine compound may be reacted to form amine derivatives which themselves are modifying agents. In fact, I have found that I may use amine derivatives as the modifying agent and add them to the resin to be modified. For instance, the reaction products of benzidine and rosin are typical of amine derivatives which are useful as modifying agents in the present processes.

I claim:

1. The non volatile portion of a varnish consisting essentially of (I) a varnish oil and (II) a varnish resin selected from the class consisting of (a) polyhydric alcohol esters of rosin, (b) rosin-maleic-polyhydric alcohol resins, (c) rosin-phenol-formaldehyde resins, and (d) rosin-polyhydric alcohol-phenol-formaldehyde resins, which varnish resin is modified by subjecting said varnish resin to the action of from about 0.1% to about 10% of an aromatic di-primary amine and to the action of heat ranging between 100° C. and 350° C. for at least one hour, said percentage of the amine being based on the total quantity of the modified varnish resin in the non volatile portion of the varnish.

2. The non volatile portion of a varnish in accordance with claim 1 in which the percentage of the amine is from about 2% to about 5%.

3. The non volatile portion of a varnish in accordance with claim 1 in which said amine is benzidine.

4. The non volatile portion of a varnish in accordance with claim 1 in which the percentage of the amine is about 0.5%.

5. The non volatile portion of a varnish consisting essentially of (I) a varnish oil and (II) a polyhydric alcohol ester of rosin as varnish resin, which varnish resin is modified by subjecting said varnish resin to the action of from about 0.1% to about 10% of an aromatic di-primary amine and to the action of heat ranging between 100° C. and 350° C. for at least one hour, said percentage of the amine being based on the total quantity of the modified varnish resin in the non volatile portion of the varnish.

6. The non volatile portion of a varnish consisting essentially of (I) a varnish oil and (II) a varnish resin which is a rosin-polyhydric alcohol-phenol-formaldehyde-resin, which varnish resin is modified by subjecting said varnish resin to the action of from about 0.1% to about 10% of an aromatic di-primary amine and to the action of heat ranging between 100° C. and 350° C., said percentage of the amine being based on the total quantity of the modified varnish resin in the non volatile portion of the varnish.

7. The non volatile portion of a varnish consisting essentially of (I) a varnish oil and (II) a varnish resin which is a rosin-maleic-polyhydric alcohol resin, which varnish resin is modified by subjecting said varnish resin to the action of from about 0.1% to about 10% of an aromatic di-primary amine and to the action of heat ranging between 100° C. and 350° C. for at least one hour, said percentage of the amine being based on the total quantity of the modified varnish resin in the non volatile portion of the varnish.

8. The non volatile portion of a varnish consisting essentially of (I) a varnish oil and (II) a varnish resin selected from the class consisting of (a) polyhydric alcohol esters of rosin, (b) rosin-maleic-polyhydric alcohol resins, (c) rosin-phenol-formaldehyde resins, and (d) rosin-polyhydric alcohol-phenol-formaldehyde resins, which varnish resin is modified by first forming a blend of an aromatic di-primary amine with rosin by heating the di-primary amine with about ten times of its weight of rosin for about five hours to temperatures ranging from about 270° C. to about 280° C., adding the so formed di-primary amine-rosin blend to said varnish resin in proportions to yield from about 0.1% to about 10% of aromatic di-primary amine content of the modified varnish resin, heating the so formed mixture to temperatures ranging between 100° C. and 350° C. for at least one hour, said percentage of the amine being based on the total quantity of the modified varnish resin in the non-volatile portion of the varnish.

LASZLO AUER.

REFERENCES CITED

The following references are of record in the file of this patent:

UNITED STATES PATENTS

| Number | Name | Date |
|---|---|---|
| 2,056,656 | Ellis | Oct. 6, 1936 |

FOREIGN PATENTS

| Number | Country | Date |
|---|---|---|
| 565,180 | Germany | Nov. 26, 1932 |